3,010,879
GROWING C. NEOFORMANS IN CAPSULAR FORM
Maxwell L. Littman, Tenafly, N.J., assignor to Media, Inc., Newark, N.J., a corporation of New Jersey
No Drawing. Filed Apr. 27, 1959, Ser. No. 808,917
1 Claim. (Cl. 195—83)

The present invention relates to the formulation of a novel culture medium for the pathogenic yeast, *Cryptococcus neoformans*. More specifically, the present invention relates to the formulation, for the first time, of a completely synthetic culture medium capable of specifically stimulating the formation of capsular substance by the organism, *C. neoformans*.

It is known that *C. neoformans* possesses an unusual affinity for the central nervous system. Once the yeast has broken through the blood-brain barrier and has seeded the cerebrospinal fluid, it is distributed by the cerebral circulation to all surfaces of the brain and spinal cord. There the organism proliferates readily and forms huge capsules that render it relatively immune to the normal defense mechanisms of the host. The pathological reaction incited in the meninges by the yeast gives rise to obstructive leptomeningitis and intracranial block. As the disease progresses, pressure of the spinal fluid steadily rises, protein content increases, the cells become more numerous, and the sugar content steadily diminishes as the yeasts consume the carbohydrates and carbohydrate derivatives of the spinal fluid. See Littman, M. L. Transactions of The New York Academy of Sciences. Ser. II, 20, 623–648 (1958).

When the disease has reached the central nervous system, the prognosis becomes extremely grave, and means for rapid identification of the organism before this time, and preferably before the organism starts to disseminate from its normally limited focus, is highly desired. The present invention provides this means and due to the presence of the capsular substance makes identification of *C. neoformans* relatively easy and certain.

During investigations with *C. neoformans* leading to the present invention, it was noted that huge capsules were synthesized in vivo by ordinarily weakly encapsulated laboratory strains of organism upon intracerebral injection of laboratory animals, and that the organism suffered loss of capsular substance upon transfer from its in vivo site to an artificial culture medium. Continued investigations led to the development of the completely synthetic and novel culture medium of the present invention. The following examples are illustrative.

*Example I.—Capsule broth*

| (1) Thiamine | gm./l | 0.001 |
|---|---|---|
| (2) Sodium glutamate | gm./l | 2 |
| (3) Maltose | gm./l | 5 |
| (4) Sucrose | gm./l | 5 |
| (5) $(NH_4)_2SO_4$ | gm./l | 2 |
| (6) $KH_2PO_4$ | gm./l | 2 |
| (7) $MgCl_2 \cdot 6H_2O$ | gm./l | 0.2 |
| (8) $CaCl_2 \cdot 2H_2O$ | gm./l | 0.02 |
| (9) $FeCl_2 \cdot 4H_2O$ | gm./l | 0.04 |
| (10) $MnCl_2 \cdot 4H_2O$ | gm./l | 0.0015 |
| (11) $Na_2MoO_4 \cdot 2H_2O$ | gm./l | 0.0015 |
| (12) Distilled water | ml | 1000 |

The ingredients are mixed with the water, the pH of the resulting solution adjusted with 1 N NaOH to about pH 7.0 and the neutral solution then autoclaved at about 118° C. for about 12 minutes. The resulting liquid or broth is an excellent medium for culturing *C. neoformans* in capsular form. This can be carried out in accordance with standard practices by innoculating the medium with the organism, culturing at about 37° C. and observing the organism growth. See Littman, N.Y. Academy publication, supra.

*Example II.—Capsule agar*

This example is made up in accordance with Example I, but contains in addition about 20 grams (2% w./v.) of washed agar. The liquid, upon cooling, after autoclaving, solidifies and, like the broth described above, is an excellent medium for culturing *C. neoformans* in capsular form.

In the above examples, it will be noted that the formulation consists essentially of (*a*) vitamin constituent (1), (*b*) amino acid constituent (2), (*c*) carbohydrate constituents (3–4), (*d*) ammonium salt constituent (5), and (*e*) basal mineral salt constituents (6–11). As for the vitamin constituent, the use of thiamine is critical as it was found to be the only water-soluble vitamin which stimulated growth of *C. neoformans* and the synthesis of capsular substance. It can be used in a range of about 10–100,000 micrograms per liter. Less than about 0.01 microgram of thiamine per ml. provides little growth and capsule synthesis while the use over about 100 micrograms per ml. of thiamine provides little, if any, additional growth or capsule synthesis.

As for the amino acid constituent, a dicarboxylic amino acid such as glutamic acid and aspartic acid or their non-toxic salts along with their amides (glutamine and asparagine) or the related proline can be used, with glutamic acid and especially its sodium salt (sodium glutamate) being generally preferred. Sodium glutamate can be used within the range of about 100 to 10,000 mg. per liter. Less than 0.1 mg./ml. of glutamate provides little desired growth with capsule synthesis and over 10 mg./ml. of glutamate is objectionable as it tends to retard capsule synthesis. As for the carbohydrate constituents, they, with the amino acid, provide sources of carbon. Various carbohydrates such as glucose, fructose, soluble starch, etc. can be used but due to the constancy of the assimilation of disaccharides by all strains of *C. neoformans*, plus the preference of the organism for disaccharides containing tthe α-glucoside structure, the use of about 0.5 to 3% (w./v.) of maltose or sucrose or mixtures of the same is preferred.

The ammonium salt provides a preferred source of nitrogen for *C. neoformans* and various non-toxic ammonium salts (e.g. $(NH_4)_3PO_4$; $NH_4Cl$, etc.) in a range of about 0.2–0.3% (w./v.) or more can be used with $(NH_4)_2SO_4$ at about 2 gm./l. being one of the preferred. The other mineral (basal salt) constituents are preferably used in trace amounts, e.g. 0.2–0.0015 gm./l. or less, and various non-toxic salts supplying Mg, Ca, Fe, Mn, etc. can be used. Unlike the thiamine and glutamate constituents, the amounts of mineral salts used are not critical and only trace amounts are required. Other constituents (moieties, families, etc.) of the type referred to above and in the Littman N.Y. Academy publication, supra, and falling within the scope of this invention, can be employed as equivalents. The preferred formulations are those described in the examples.

It will be apparent from the above that the synthetic formula of the present invention, either in liquid broth or solid agar form, can be used advantageously in the laboratory to rapidly identify *C. neoformans*. It will also be apparent that the present invention can be used for the production of Cryptococcus capsule substance (capsular polysaccharide), and for the preparation of Cryptococcus antigenic substance for skin testing and for the preparation of immune serum. Due to sensitivity of the organism for thiamine and not for other water soluble vitamins, it will be further apparent from the above that *C. neoformans* can be used for microbiological assay of thiamine.

I claim:

The method of growing the pathogenic yeast, *C. neoformans*, in capsular form, which comprises growing the yeast in a culture medium containing as essential ingredients about 10–100,000 micrograms/l. of thiamine, about 100–10,000 mg./l. of sodium glutamate and about 0.5–3% (w./v.) of a disaccharide selected from the group consisting of maltose and sucrose.

References Cited in the file of this patent

UNITED STATES PATENTS

| | | |
|---|---|---|
| 2,544,273 | Miner et al. | Mar. 6, 1951 |
| 2,595,499 | Wood et al. | May 6, 1952 |
| 2,666,014 | VanLanen | Jan. 12, 1954 |
| 2,689,204 | Nickerson | Sept. 14, 1954 |
| 2,844,515 | Sobotka | July 22, 1958 |